United States Patent [19]
Hollinger et al.

[11] Patent Number: 5,680,753
[45] Date of Patent: Oct. 28, 1997

[54] METHOD OF REGULATING THE ROTATIONAL SPEED OF A GAS TURBINE DURING LOAD DISCONNECTION

[75] Inventors: Klaus Hollinger, Zuzgen; Gerhard Müller, Wettingen, both of Switzerland

[73] Assignee: Asea Brown Boveri AG, Baden, Switzerland

[21] Appl. No.: 439,245

[22] Filed: May 11, 1995

[30] Foreign Application Priority Data

Aug. 19, 1994 [DE] Germany ............... 44 29 539.1

[51] Int. Cl.$^6$ ..................................... F23R 3/30
[52] U.S. Cl. ............................ 60/39.03; 60/747
[58] Field of Search ............... 60/39.03, 39.091, 60/734, 737, 738, 739, 746, 747

[56] References Cited

U.S. PATENT DOCUMENTS 5,154,059 10/1992 Keller ........................... 60/747
5,201,181 4/1993 Ohmori et al. ................. 60/39.03
5,361,576 11/1994 Muller ........................... 60/39.03

FOREIGN PATENT DOCUMENTS 0321809 6/1989 European Pat. Off. .
2041085 9/1980 United Kingdom .

*Primary Examiner*—Michael Koczo
*Attorney, Agent, or Firm*—Burns, Doane, Swecker & Mathis, L.L.P.

[57] ABSTRACT

In a method of regulating the rotational speed of a gas turbine during load disconnection, the fuel line (8) of which to the combustion chamber (10) can be controlled via regulating valves (5) and via burner control valves (6), and the combustion chamber of which is operated with premixing burners (11), some of the premixing burners are used as idling premixing burners (11a) and the rest are operated only as main burners. During load disconnection, the main burners are shut off by means of the burner control valve (6), and the idling premixing burners are supplied with fuel via a regulated bypass line (3).

5 Claims, 1 Drawing Sheet

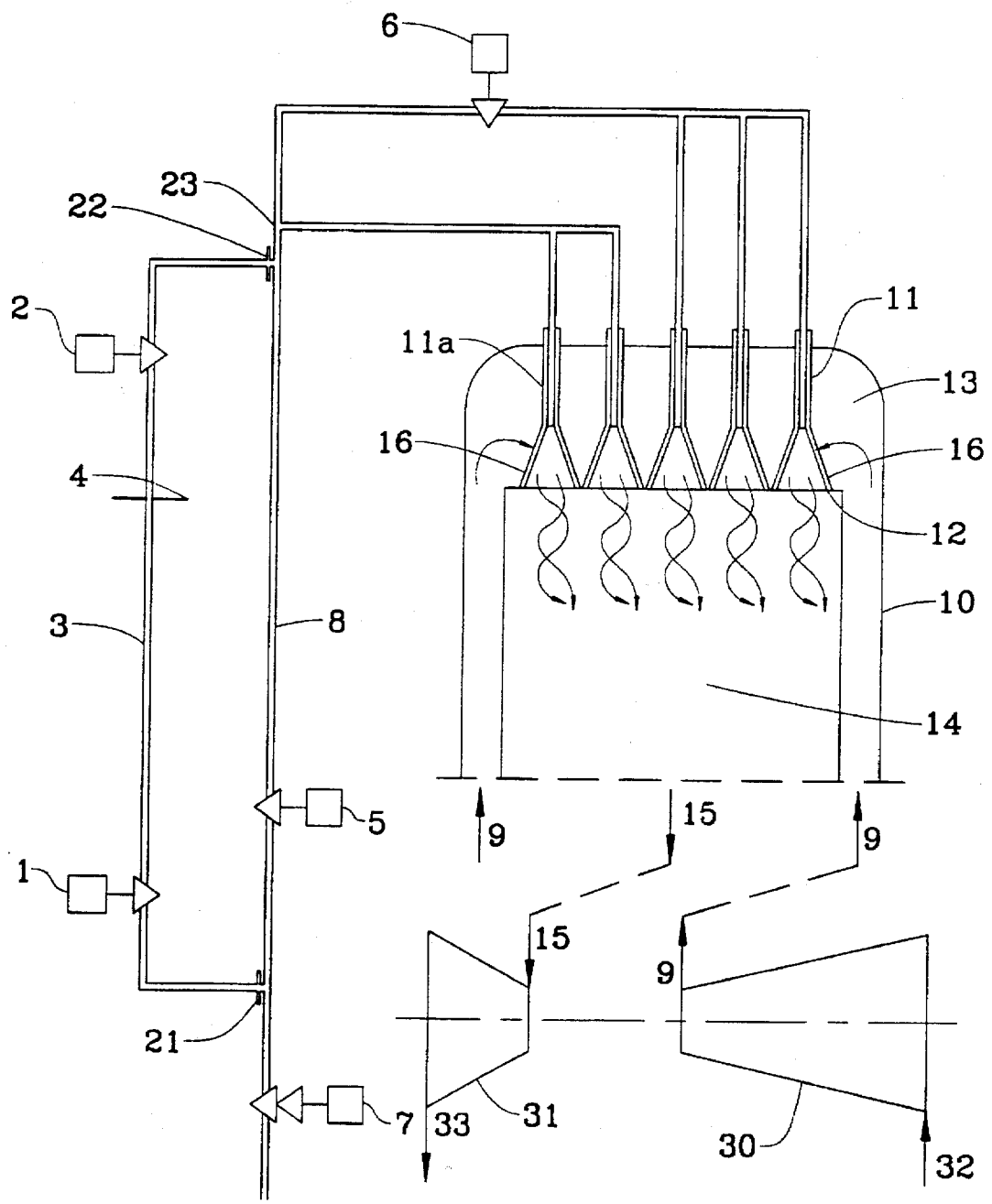

//5,680,753//

METHOD OF REGULATING THE ROTATIONAL SPEED OF A GAS TURBINE DURING LOAD DISCONNECTION

FIELD OF THE INVENTION

The invention relates to a method of regulating the rotational speed of a gas turbine during load disconnection, the fuel line of which to the combustion chamber can be controlled via regulating valves and via burner control valves, and the combustion chamber of which is operated with premixing burners.

BACKGROUND

Methods of this type are known. In the event of incidents during the gas-turbine operation, such as a defect in the switchgear, problems with the boiler-water supply, sudden cut-out of consumers, it is necessary to immediately separate the gas turbine from the electric network by opening the generator switch. By this action, called load disconnection, the rotational speed of the turbine increases due to the elimination of the load. In order to bring the rotational speed of the gas turbine under control, the fuel feed is throttled by regulating valves, but only to an extent such that the flame in the combustion chamber is not completely extinguished. It is advantageous to hold the gas turbine at rated speed in order to reduce the stress on the gas turbine and in order to be able to reconnect the plant more quickly to the network after the fault is rectified.

In the diffusion burners used hitherto, the flame is stable over a wide mixture ratio between fuel and air. The regulation of the fuel feed and thus the regulation of the rotational speed via regulating valves accordingly represents no problem. However, in order to reduce the pollutant emission, in particular the nitrogen-oxide emission, the diffusion burners are being replaced by premixing burners in plants already in existence. These premixing burners are operated with a lean mixture containing a very high air portion, which results in very low nitrogen-oxide emissions. However, their flame is only stable in a narrow mixture ratio between fuel and air, and this imposes high demands on the regulating valves during load disconnection. The regulating valves already existing in the plant normally cannot be regulated accurately enough and are therefore not designed for these demands. The regulating valves therefore have to be replaced, but this is very time-consuming and thus expensive.

SUMMARY OF THE INVENTION

Accordingly, one object of the invention in a method of the type mentioned at the beginning is to avoid the time-consuming and expensive replacement of the existing regulating valves.

According to the invention, this is achieved when some of the premixing burners are used as idling premixing burners and the rest are operated only as main burners, and when, during load disconnection, the main burners are shut off by means of the burner control valve, and the idling premixing burners are supplied with fuel via a regulated bypass line.

The advantages of the invention can be seen, inter alia, in the fact that, by the fitting of the bypass line, the existing regulating valves can continue to be used for the normal operation of the gas turbine and need not be replaced. Despite the unfavorable regulating characteristic of the regulating valves, the gas turbine can kept at rated speed by the bypass line and the bypass valves during load disconnection. It is advantageous to use two different types of bypass valves: a quick-opening bypass valve and a slow-closing bypass valve, which in its characteristic corresponds to that of the regulating valve. In addition, it is advantageous by means of a flow limit, a so-called orifice, to set the fuel mass flow through the bypass line to the requisite magnitude.

In order to save further costs and time, it is especially convenient to fasten the bypass line to already existing flanges of the fuel line. These flanges are in any case attached to the fuel line for measuring and observation purposes.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, which shows an exemplary embodiment of the invention with reference to a schematic representation of the gas turbine, the schematic fuel lines and a partial longitudinal section of the combustion chamber.

Only the elements essential for understanding the invention are shown. The generator and the rest of the elements of the gas turbine plant are not shown.

DESCRIPTION OF THE PREFERRED EMBODIMENT

Referring now to the drawing, the gas turbine plant essentially consists of a compressor 30 and a gas turbine 31, which are connected via a shaft (not shown), and of a combustion chamber 10. Air 32 is drawn in and compressed in the schematically represented compressor, and the compressed air 9 is directed into the plenum 13 of the silo combustion chamber 10 used here. From there the compressed air, via premixing burners 11 in which fuel is fed to the air, enters a combustion space 14, where the fuel/air mixture is burnt. The hot gas 15 which has thus developed is directed into a gas turbine 31, where it is expanded and a portion of the energy of the hot gas is converted into rotary energy. The resulting exhaust gas 33 is drawn off via a flue (not shown).

The schematically represented premixing burners 11 are so-called double-cone burners as disclosed, for example, by U.S. Pat. No. 4,932,861 to Keller et al. A double-cone burner essentially consists of two hollow, conical sectional bodies which are nested one inside the other in the direction of flow. Here, the respective center axes of the two sectional bodies are offset from one another. The adjacent walls of the two sectional bodies form slots 16, along the longitudinal extent, for the tangential directed entry of compressed air 9, which in this way passes into the burner interior. A first fuel nozzle for liquid fuel is arranged there. The fuel is injected into the hollow cone at an acute angle. The resulting conical fuel profile is enclosed by the air 9 flowing in tangentially. The concentration of fuel is continuously reduced in the axial direction as a result of the mixing with the compressed air. If the burner is operated with gaseous fuel, gas-inflow openings distributed in the longitudinal direction are provided for this purpose in the area of the tangential slots 16 in the walls of the two sectional bodies. During gas operation, the mixture formation with the combustion air therefore already starts in the zone of the inlet slots 16. It will be understood that a mixed operation with both types of fuel is also possible in this way. A fuel concentration which is as homogeneous as possible appears at the burner outlet 12 over the annular cross-section acted upon. A defined spherical backflow zone develops at the burner outlet, at the tip of which backflow zone ignition is effected.

The fuel lines are shown schematically in the drawing. One fuel line 8 leads to a regulating valve 5 via a quick-closing valve 7 used for emergency shut-off. The fuel line leads from there to a branch 23, from which it leads into idling premixing burners 11a and via a burner control or shut-off valve 6 into the remaining premixing burners 11. The regulating valve 5 is bypassed by a bypass line 3 which is attached to the flanges 21 and 22. A first bypass valve 1, a second bypass valve 2 and a flow limit 4, called orifice, are located in the bypass line.

During normal operation of the gas turbine, the second bypass valve 2 is closed, and the first bypass valve 1 as well as the burner control valve 6 and the quick-closing valve 7 are open. The fuel mass flow and thus the rotational speed of the gas turbine are controlled via the regulating valve 5. If the regulating valve 5 is throttled, the fuel mass flow is reduced and the burner output drops, for which reason the rotational speed of the gas turbine decreases.

If a load disconnection occurs, the rotational speed of the gas turbine increases, since no output is drawn off. The burner control valve 6 is immediately closed and only the idling premixing burners 11a remain in operation. At the same time, the regulating valve 5 attempts to lower the rotational speed to rated speed and closes. So that the fuel pressure into the idling premixing burners does not drop below the requisite magnitude and extinguishes the flame, the second bypass valve 2 opens in split seconds. The bypass line 3 now feeds the idling premixing burners, in which case the fuel quantity necessary for operation has been set by means of the orifice 4. As soon as the rotational speed of the gas turbine has stabilized at rated speed for the disconnect condition after a few seconds, the first bypass valve 1 closes so slowly that the regulating valve 5 can follow up. When the first bypass valve 1 is completely closed, the regulating valve 5 again assumes the function of regulating the operation of the gas turbine. The second bypass valve 2 is now closed and the first bypass valve 1 opened. The gas turbine is again ready to resume normal operation and for the next load disconnection.

The invention is of course not restricted to the method shown and described. The configuration of the bypass line, the fastening to the fuel line, and the number of bypass valves can be selected as desired. The precondition is only that the regulating valve is bypassed and that the bypass line opens quickly and can be closed in accordance with the regulating valve. A plurality of regulating valves and burner control valves can be used to control the burners, in which case the number of bypass lines must be adapted to the requirements.

Any possible type of combustion chamber, such as annular combustion chamber and silo combustion chamber, is of course suitable for applying the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for regulating the rotational speed of a gas turbine during load disconnection, wherein the gas turbine includes a combustion chamber having a plurality of premixing burners, a first group of premixing burners operated as main burners and a second group of premixing burners operated as idling burners, a main fuel line to the combustion chamber having a regulating valve to control a flow of fuel to said plurality of premixing burners, the main line branching into a first branch for the first group and a second branch for the second group, the first branch having a shut-off valve, and wherein a bypass line having regulating means is connected to the main line to bypass the regulating valve, the method comprising the steps, upon load disconnection, of:

closing the shut-off valve in the first branch;
closing the regulating valve; and
supplying fuel to the idling premixing burners through the bypass line to maintain operation of the idling premixing burners.

2. The method as claimed in claim 1, wherein the bypass line includes, in a flow direction, a normally open first bypass valve and a normally closed second bypass valve, and wherein the step of supplying fuel through the bypass line includes:

maintaining the first bypass valve open; and
opening the second bypass valve to allow fuel to flow through the bypass line.

3. The method as claimed in claim 2, further comprising the step of regulating the flow of fuel through the bypass line.

4. The method as claimed in claim 1, further comprising the step of regulating the flow of fuel through the bypass line while fuel is supplied through the bypass line.

5. The method as claimed in claim 2, further comprising the step of:

adjusting a fuel flow to the idling burners to stabilize a rotational speed of the turbine;
after the rotational speed is stabilized, actuating the first bypass valve to a closed position;
responsive to closing movement the first bypass valve, opening the regulating valve in the main line, wherein the main line is opened and the regulating valve resumes control of the fuel flow to the burners; and then
closing the second valve in the bypass line.

* * * * *